US011763289B2

(12) United States Patent
Yoon

(10) Patent No.: US 11,763,289 B2
(45) Date of Patent: *Sep. 19, 2023

(54) METHOD OF OPERATING PAYMENT DEVICE FOR SELECTIVELY ENABLING PAYMENT FUNCTION ACCORDING TO VALIDITY OF HOST

(71) Applicant: Samsung Electronics Co., Ltd., Suwon-si (KR)

(72) Inventor: Joong Chui Yoon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 313 days.

This patent is subject to a terminal disclaimer.

(21) Appl. No.: 17/078,600

(22) Filed: Oct. 23, 2020

(65) Prior Publication Data

US 2021/0042731 A1    Feb. 11, 2021

Related U.S. Application Data

(63) Continuation of application No. 15/254,175, filed on Sep. 1, 2016, now Pat. No. 10,853,790.

(30) Foreign Application Priority Data

Sep. 25, 2015  (KR) .................. 10-2015-0137063

(51) Int. Cl.
*G06Q 20/32* (2012.01)
*G06Q 20/38* (2012.01)
*G06Q 20/40* (2012.01)

(52) U.S. Cl.
CPC ..... *G06Q 20/3278* (2013.01); *G06Q 20/3226* (2013.01); *G06Q 20/3227* (2013.01);
(Continued)

(58) Field of Classification Search
CPC .......... G06Q 20/3229; G06Q 20/3226; G06Q 20/3227; G06Q 20/3278; G06Q 20/3829; G06Q 20/405
See application file for complete search history.

(56) References Cited

U.S. PATENT DOCUMENTS 7,496,957 B2   2/2009  Howard et al.
8,196,131 B1   6/2012  von Behren et al.
(Continued)

FOREIGN PATENT DOCUMENTS

JP     2014-086084 A    5/2014
KR  10-2009-0041352 A   4/2009
(Continued)

OTHER PUBLICATIONS

W. Anwar, D. Lindskog, P. Zavarsky and R. Ruhl, "Redesigning secure element access control for NFC enabled android smartphones using mobile trusted computing," International Conference on Information Society (i-Society 2013), Toronto, ON, Canada, 2013, pp. 27-34.*

(Continued)

*Primary Examiner* — Steven S Kim
(74) *Attorney, Agent, or Firm* — Harness, Dickey & Pierce, P.L.C.

(57) ABSTRACT

A method of operating a payment device for selectively enabling a payment function according to the validity of a host is provided. The method relates to a method of operating the payment device which includes a near field communication controller (NFCC) and a host communicating with the NFCC. The method selectively enables the payment function according to the validity of the host, thereby preventing illegal or unwanted payment.

20 Claims, 12 Drawing Sheets

(52) U.S. Cl.
CPC ..... *G06Q 20/3229* (2013.01); *G06Q 20/3829* (2013.01); *G06Q 20/405* (2013.01)

(56) References Cited

U.S. PATENT DOCUMENTS

| | | | |
|---|---|---|---|
| 8,646,059 B1 | 2/2014 | von Behren et al. | |
| 8,762,720 B2* | 6/2014 | Charrat | H04L 9/3273 713/169 |
| 8,762,742 B2 | 6/2014 | Buer | |
| 9,288,107 B2 | 3/2016 | Tomas et al. | |
| 9,299,072 B2 | 3/2016 | Khan et al. | |
| 9,646,303 B2 | 5/2017 | Karpenko et al. | |
| 9,860,749 B2 | 1/2018 | Huxham et al. | |
| 10,044,510 B2 | 8/2018 | Kwon et al. | |
| 10,237,722 B2 | 3/2019 | Chen et al. | |
| 10,609,026 B2 | 3/2020 | Han et al. | |
| 10,853,790 B2* | 12/2020 | Yoon | G06Q 20/3227 |
| 10,909,531 B2* | 2/2021 | Roberts | G06Q 20/3829 |
| 2003/0159041 A1 | 8/2003 | Yokota et al. | |
| 2004/0043792 A1 | 3/2004 | Simmons | |
| 2007/0050627 A1 | 3/2007 | Chiku | |
| 2008/0162312 A1* | 7/2008 | Sklovsky | H04L 63/20 705/1.1 |
| 2008/0320587 A1 | 12/2008 | Vauclair et al. | |
| 2010/0062808 A1 | 3/2010 | Cha et al. | |
| 2010/0216396 A1* | 8/2010 | Fernandez | H04W 4/80 705/40 |
| 2011/0131421 A1 | 6/2011 | Jogand-Coulomb et al. | |
| 2012/0297204 A1 | 11/2012 | Buer | |
| 2013/0060959 A1 | 3/2013 | Taveau et al. | |
| 2014/0073375 A1 | 3/2014 | Li et al. | |
| 2014/0108263 A1 | 4/2014 | Ortiz et al. | |
| 2014/0130151 A1* | 5/2014 | Krishnamurthy | G06F 8/65 726/22 |
| 2014/0156872 A1 | 6/2014 | Buer et al. | |
| 2014/0256251 A1 | 9/2014 | Caceres et al. | |
| 2014/0279566 A1 | 9/2014 | Verma et al. | |
| 2014/0283018 A1 | 9/2014 | Dadu et al. | |
| 2015/0105015 A1 | 4/2015 | Wang et al. | |
| 2015/0294304 A1* | 10/2015 | Donnellan | G06Q 20/3278 705/44 |
| 2016/0071081 A1 | 3/2016 | Zheng et al. | |
| 2016/0105925 A1 | 4/2016 | Wang et al. | |
| 2016/0275461 A1 | 9/2016 | Sprague et al. | |
| 2016/0277933 A1 | 9/2016 | Moon | |
| 2016/0366540 A1 | 12/2016 | Teruyama | |
| 2017/0109546 A1 | 4/2017 | Nerot | |
| 2018/0150826 A1* | 5/2018 | Schwartz | G06Q 20/351 |
| 2018/0165673 A1 | 6/2018 | Francis | |

FOREIGN PATENT DOCUMENTS

| | | |
|---|---|---|
| KR | 2014-0018044 A | 2/2014 |
| KR | 101460182 B1 | 11/2014 |

OTHER PUBLICATIONS

L. Jing, J. Chunhua and Y. Xia, "Design and implementation of security OS based on Trustzone," 2013 IEEE 11th International Conference on Electronic Measurements. Instruments, Harbin, China, 2013, pp. 1027-1032, doi: 10.1109/ICEMI.2013.6743208.*

NFC Controller Interface (NCI) Specification; Nov. 6, 2012.

KR Office Action dated Jan. 28, 2022 issued in corresponding Korean patent application No. 10-2015-0137063.

* cited by examiner

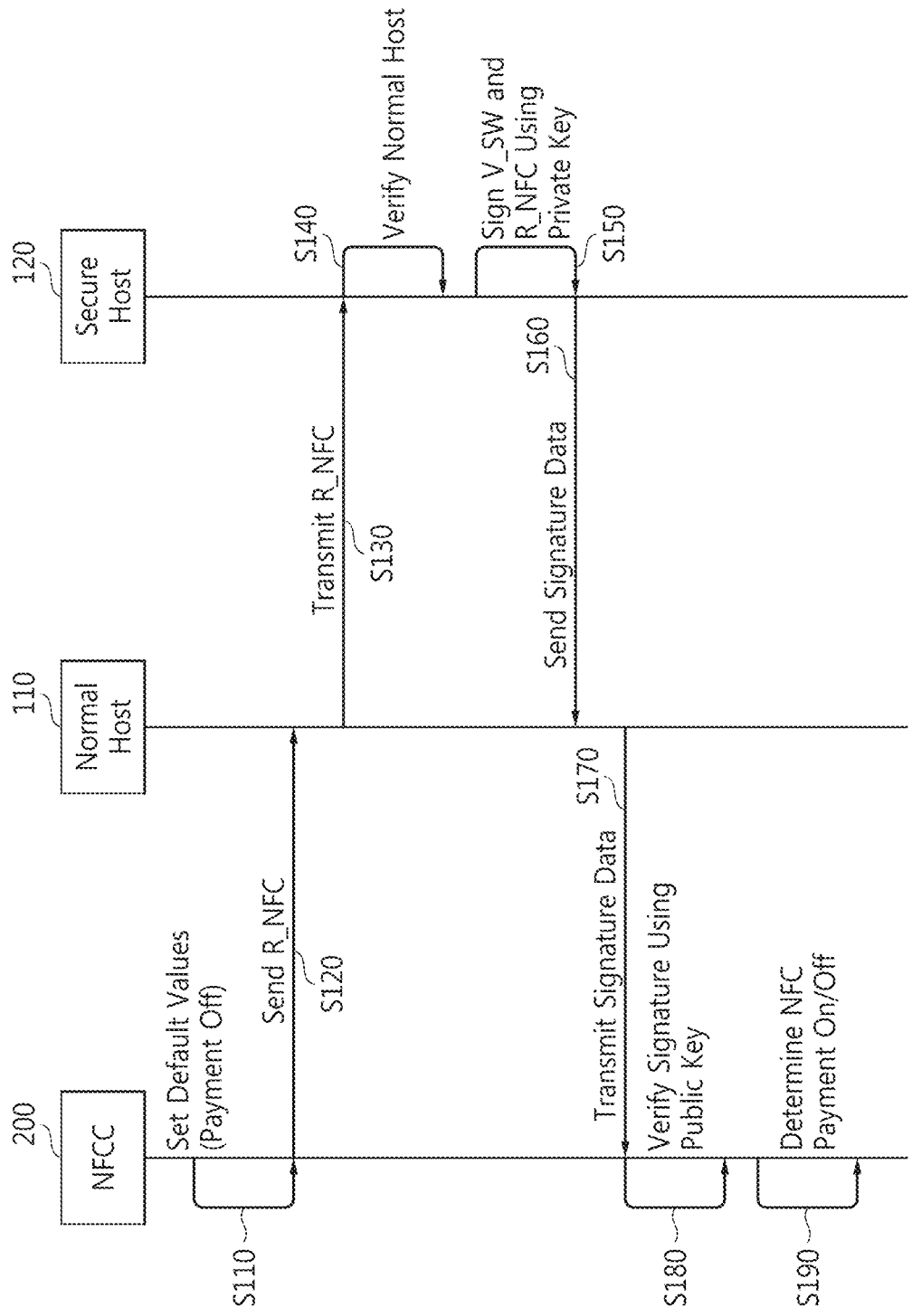

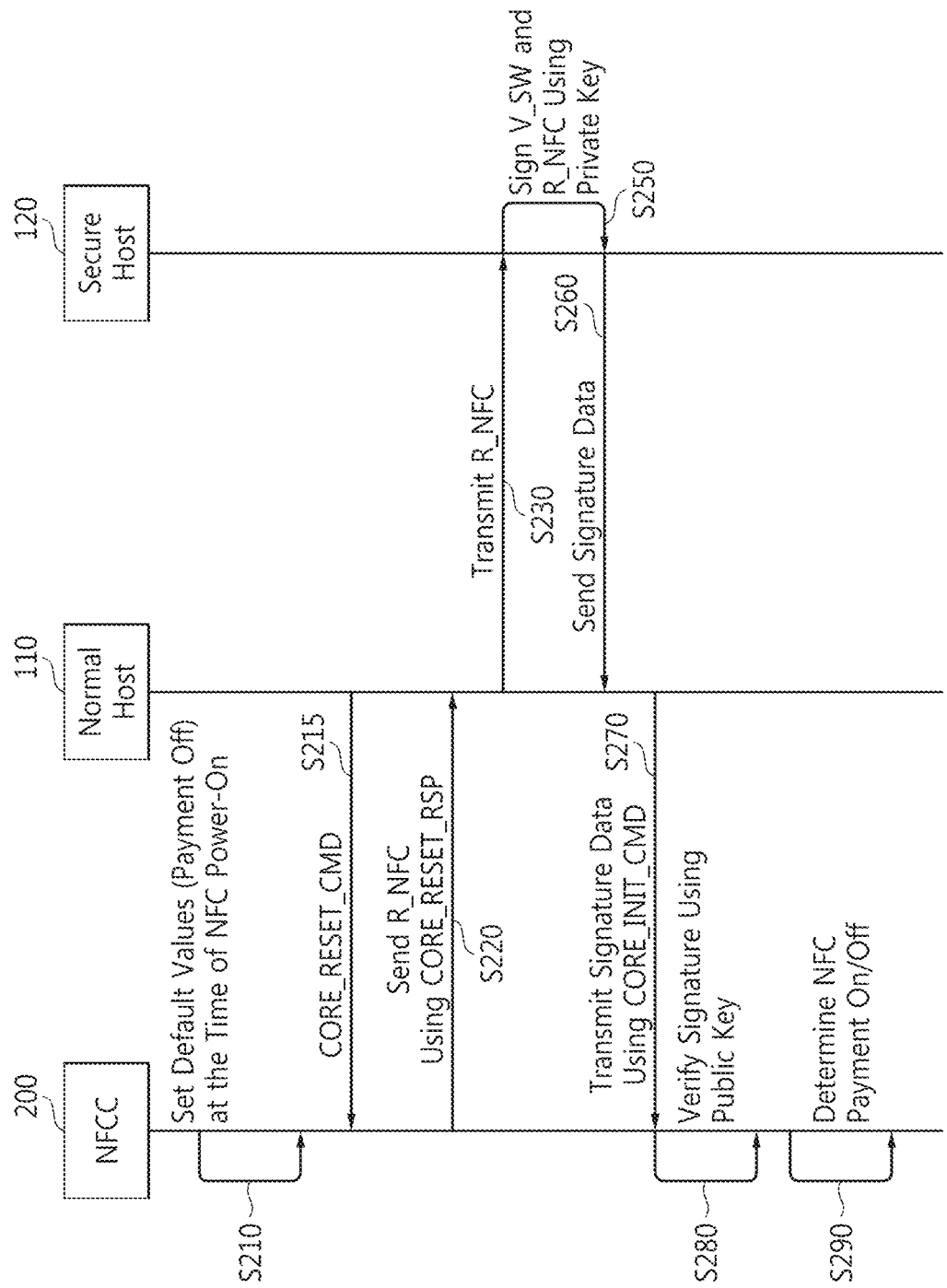

FIG. 5B

| CORE_RESET_RSP | | |
|---|---|---|
| Payload Field(s) | Length | Value/Description |
| Status | 1 Octet | |
| NCI Version | 1 Octet | |
| Configuration Status | 1 Octet | |
| Random Number | n Octet(s) | R_NFC |

FIG. 5C

| | | CORE_INIT_CMD |
|---|---|---|
| Payload Field(s) | Length | Value/Description |
| Feature Enable | 0 or 2 Octets | If included, control for a set of bits that are used to enable or disable certain NFCC features that might cause compatibility problems for a DH that implements an earlier minor release feature to ensure backwards compatible operation. See Table 9. |
| Signature Data | m Octet(s) | SIG_DAT |

METHOD OF OPERATING PAYMENT DEVICE FOR SELECTIVELY ENABLING PAYMENT FUNCTION ACCORDING TO VALIDITY OF HOST

CROSS-REFERENCE TO RELATED APPLICATION

The present application is a continuation of and claims the of priority under 35 U.S.C. § 120 to U.S. patent application Ser. No. 15/254,175, filed on Sep. 1, 2016, which claims priority under 35 U.S.C. § 119(a) to Korean Patent Application No. 10-2015-0137063, filed on Sep. 25, 2015 in the Korean Intellectual Property Office (KIPO), the disclosures of each of which are hereby incorporated by reference in their entireties.

BACKGROUND

Example embodiments of the inventive concepts relate to a payment device and a method of operating the same, and more particularly, to a payment device including a near field communication controller (NFCC) and a method of operating the same.

With the development of mobile payment technology using mobile terminals, various mobile payment methods are used. A mobile terminal is usually equipped with a near field communication (NFC) integrated circuit (IC) chip (e.g., NFC chip) for mobile payment. NFC technology has been developed and standardized by a consortium called NFC Forum™ (http://www.nfc-forum.org).

NFC is technology for enabling data to be transmitted at a short distance of about 10 cm between terminals equipped with an NFC chip through contactless short-range wireless communication using a frequency band of 13.56 MHz. NFC is used for mobile payment because it is excellent in light of proximity, bidirectional property, and security as compared to other technology and is advantageous in that terminals recognize each other in a short time (less than ⅒ second) without needing a complicated pairing.

Meanwhile, one of the important issues of mobile payment is security. In other words, security functions are required to prevent invalid payments, i.e., illegal payment. There is a technique for controlling one of the pins of an NFC chip in order to prohibit the payment function of the NFC chip when a host of a mobile terminal is not valid. However, this technique requires a special pin (i.e., a lock pin) for the NFC chip.

SUMMARY

Some example embodiments of the inventive concepts also provide a method of operating a payment device for preventing illegal or unwanted payment by disabling a payment function when a host is not validated.

According to some example embodiments of the inventive concepts, there is provided a method of operating a payment device, the payment device including a near field communication controller (NFCC) and a host, the host configured to communicate with the NFCC and including a normal host and a secure host. The method includes the NFCC generating, using the NFCC, unique data, sending, using the NFCC, the unique data to a normal host, transmitting, using the normal host, the unique data to a secure host, generating, using the secure host, signature data based on verification data obtained by verifying validity of the normal host and the unique data, sending, using the secure host, the signature data to the normal host, transmitting, using the normal host, the signature data to the NFCC, verifying, using the NFCC, the signature data, and selectively enabling, using the NFCC, a payment function according to a result of the verifying, the host including the secure host operating based on a secure operating system and the normal host operating based on a normal operating system.

The method may further include disabling, using the NFCC, the payment function before the generating the unique data.

The disabling the payment function may be performed when the NFCC is powered on.

The method may further include issuing, using the normal host, a reset command to the NFCC to reset the NFCC, and sending, using the NFCC, a reset response message to the normal host in response to the reset command, wherein the unique data is transmitted together with the reset response message from the NFCC to the normal host. The unique data may be included in a payload field of the reset response message.

The method may further include issuing, using the normal host, an initialization command to the NFCC, the initialization command initializing the NFCC. The signature data may be transmitted together with the initialization command from the normal host to the NFCC. The signature data may be included in a payload field of the initialization command.

The generating the signature data may include signing the verification data and the unique data using a first secure key and the first secure key is a Rivest-Shamir-Adleman (RSA) private key.

The verifying the signature data may include verifying, using the NFCC, the signature data using a second secure key, and the second secure key may be an RSA public key.

The unique data may be a randomly generated number.

According to other example embodiments of the inventive concepts, there is provided a method of operating a payment device, the payment device including a near field communication controller (NFCC), a payment module configured to communicate with the NFCC, and a host configured to communicate with the NFCC. The method includes the generating, using the payment module, unique data, sending, using the payment module, the unique data to the NFCC, transmitting, using the NFCC, the unique data to the host, generating, using the host, signature data based on verification data indicating validity of the host and the unique data, sending, using the host, the signature data to the NFCC, transmitting, using the NFCC, the signature data to the payment module, verifying, using the payment module, the signature data, and selectively enabling, using the payment module, a payment function according to a result of the verifying.

The host may include a secure host operating based on a secure operating system and a normal host operating based on a normal operating system. The generating the signature data may include the secure host verifying, using the secure host, validity of the normal host, generating, using the secure host, the verification data, and generating, using the secure host, the signature data by signing the verification data and the unique data using a first secure key.

The transmitting the unique data to the host may include transmitting, using the NFCC, the unique data to the normal host, and transmitting, using the normal host, the unique data to the secure host. The transmitting the signature data to the NFCC may include transmitting, using the secure host, the signature data to the normal host, and transmitting, using the normal host, the signature data to the NFCC.

The method may further include sending, using the NFCC, an initialization message to the payment module, and disabling, using the payment module, the payment function in response to the initialization message, and disabling, using the payment module, the payment function in response to the initialization message.

The method may further include issuing, using the normal host, a reset command to the NFCC, the reset command including instructions to reset the NFCC, and sending, using the NFCC, a reset response message to the normal host in response to the reset command. The unique data may be transmitted together with the reset response message from the NFCC to the normal host.

The method may further include issuing, using the normal host, an initialization command to the NFCC, the initialization command including an instruction to initialize the NFCC. The signature data may be transmitted together with the initialization command from the normal host to the NFCC. The first secure key may be a Rivest-Shamir-Adleman (RSA) private key.

The verifying the signature data may include verifying, using the NFCC, the signature data using a second secure key, and the second secure key may be an RSA public key and the unique data may be a randomly generated number.

The method may further include transmitting payment information to the NFCC when the payment function is enabled, transmitting, using the NFCC, the payment information to an NFC reader to allow payment to be performed. The payment module may be a subscriber identity module (SIM) configured to store subscriber information and the payment information.

The method may further include transmitting payment information to the NFCC when the payment function is enabled, and transmitting, using the NFCC, the payment information to an NFC reader to allow payment to be performed. The payment module may be formed separately from a subscriber identity module (SIM) and the SIM may be configured to store subscriber information and the payment information. Alternatively, the payment module may be formed separately from the SIM.

According to still other example embodiments of the inventive concepts, there is provided a method of operating a payment module configured to communicate with a near field communication controller (NFCC). The method includes receiving, using the payment module, an initialization message from the NFCC, generating, using the payment module, unique data in response to the initialization message and sending the unique data to the NFCC, receiving, using the payment module, signature data and verification data from the NFCC, the signature data based on the unique data and the verification data indicating validity of a host, verifying, using the payment module, the signature data, and selectively enabling, using the payment module, a payment function of the payment module according to a verification result.

The method may further include disabling the payment function in response to the initialization message before the transmitting the unique data to the NFCC.

The method may further include transmitting payment information to the NFCC when the payment function is enabled. The payment module may be a subscriber identity module (SIM) configured to store subscriber information and the payment information. The transmitting payment information to the NFCC may further include transmitting, using the NFCC, the payment information to an NFC reader to allow payment to be performed.

The method may further include transmitting payment information to the NFCC when the payment function is enabled. The payment module may be formed separately from a subscriber identity module (SIM), and the transmitting payment information to the NFCC may include transmitting, using the NFCC, the payment information to an NFC reader to allow payment to be performed.

The signature data may be generated using a Rivest-Shamir-Adleman (RSA) private key, the verifying the signature data may include verifying the signature data using an RSA public key, and the unique data may be a randomly generated number.

According to further example embodiments of the inventive concepts, there is provided a method of operating an NFCC configured to communicate with a host and a payment module.

The method includes disabling, using the NFCC, a payment function when the NFCC is powered on, generating, using the NFCC, unique data, sending, using the NFCC, the unique data to the host, receiving, using the NFCC, signature data and verification data from the host, the signature data based on the unique data and the verification data indicating validity of the host, verifying, using the NFCC, the signature data, and selectively enabling, using the NFCC, the payment function according to a result of the verifying.

The method may further include receiving a reset command from the host before the transmitting the unique data to the host. The reset command may be an NFC controller interface (NCI) command defined by NFC Forum™ to reset the NFCC.

The transmitting the unique data to the host may include generating the unique data in response to the reset command, and transmitting the unique data together with a reset response message to the host. The reset response message may be an NCI message defined by the NFC Forum™ to respond to the reset command.

The signature data may be transmitted from the host to the NFCC together with an initialization command to initialize the NFCC.

The method may further include receiving payment information from the payment module, and transmitting the payment information to an NFC reader.

According to another example embodiment of the inventive concepts, a method of operating a payment device includes generating, using at least one near field communication controller (NFCC) processor, a random number using a random number generator, transmitting, using the at least one NFCC processor, the generated random number to at least one application processor, receiving, using the at least one NFCC processor, a verification message from the at least one application processor, the verification message including an indication of whether a host executing on the at least one application processor is valid and signature data generated using a first secure key and the generated random number, decoding, using the at least one NFCC processor, the verification message using a second encryption key corresponding to the first encryption key, determining, using the at least one NFCC processor, whether the host is valid based on the verification message and the generated random number of the verification message, and performing, using the at least one NFCC processor, a payment function associated with the host based on results of the determining.

The performing the payment function may include transmitting, using the at least one NFCC processor, account information stored on a subscriber identity module (SIM) card or an embedded secure element (eSE) chip to a NFC terminal.

The determining whether the host is valid may include determining whether the generated random number of the verification message is consistent with the generated random number transmitted by the at least one controller processor.

The first encryption key may be a RSA private key and the second encryption key may be a RSA public key corresponding to the RSA private key.

The method may further include disabling, using the at least one NFCC processor, the payment function associated with the host based on the results of the determining.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 3 is a flowchart of a method of operating a mobile payment device according to some example embodiments of the inventive concepts;

FIG. 4 is a flowchart of a method of operating a mobile payment device according to other example embodiments of the inventive concepts;

FIG. 5B is a diagram of a reset response message illustrated in FIG. 4 according to some example embodiments of the inventive concepts;

FIG. 5C is a diagram of an initialization command illustrated in FIG. 4 according to some example embodiments of the inventive concepts;

DETAILED DESCRIPTION

Figure 1:
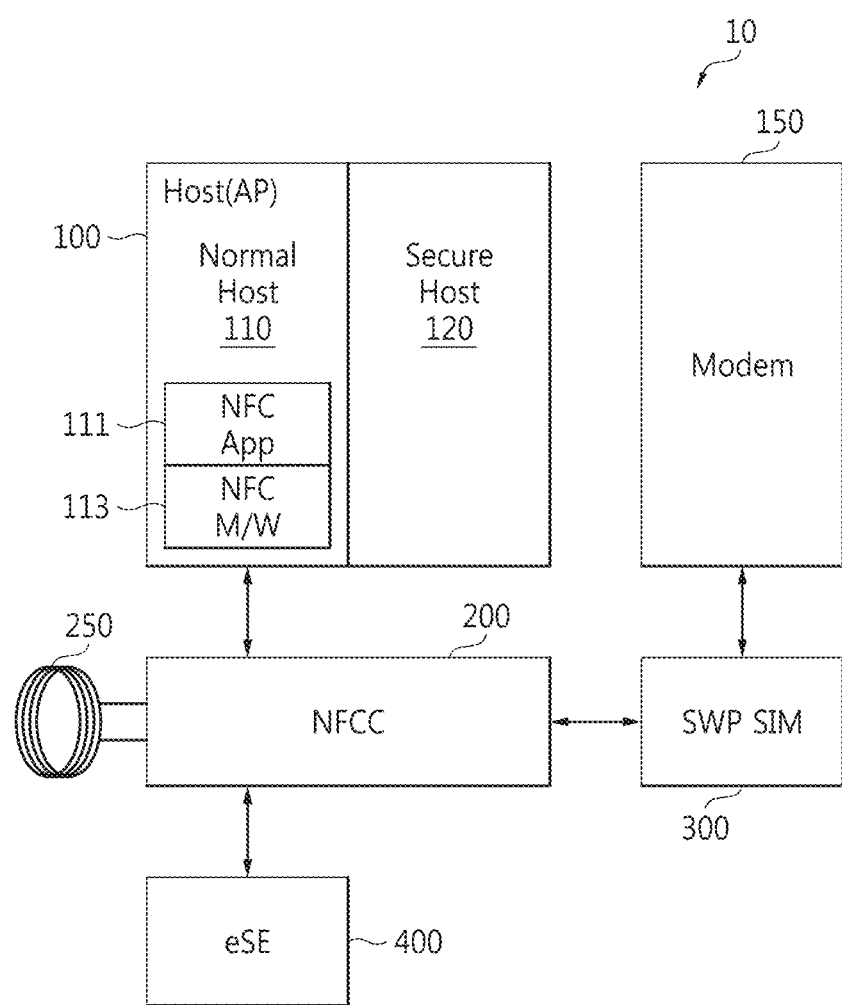
FIG. 1 is a schematic diagram of a mobile payment device according to some example embodiments of the inventive concepts.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic diagram of a mobile payment device 10 according to some example embodiments of the inventive concepts. The mobile payment device 10 includes a host 100, a modem 150, a near field communication controller (NFCC) 200, a secure module, i.e., an embedded secure element (eSE) 400, and a subscriber identity module (SIM) 300. The eSE 400 or the SIM 300 may be called a payment module. The mobile payment device 10 may be implemented as a mobile terminal such as a smart phone, a tablet, a personal digital assistant (PDA), an enterprise digital assistant (EDA), a mobile internet device (MID), a wearable device, a laptop, an Internet of Things (IoT) device, a portable gaming console, etc.

The host 100 may be at least one application processor (AP), which is a main processing chip of the mobile payment device 10. The AP may be implemented as a system on chip (SoC). The host 100 may include a normal host 110 which operates based on a normal operating system (OS) or a non-secure OS and a secure host 120 which operates based on a secure OS. The non-secure OS may be Android® OS and the secure OS may be TrustZone®, but the inventive concepts are not restricted thereto. When the host 100 is an AP, the AP may be divided into a normal AP and a secure AP (e.g., at least two APs operating in connection with each other, a single AP including at least two processing cores, a single AP executing the normal host and the secure host in a parallel or time-share manner, etc.), but the inventive concepts are not restricted to this example.

The normal host 110 may include a normal AP, a normal OS operating in the normal AP, and application software 111 and middleware 113 which are executed in connection with the normal OS. The secure host 120 may include a secure AP, a secure OS operating in the secure AP, and a program executed in connection with the secure OS.

The normal host 110 may execute the NFC-based application software (hereinafter, referred to as an "NFC application") 111. The NFC application 111 and relevant data may be stored in non-volatile memory (not shown); the normal host 110 may execute the NFC application 111 stored in the memory.

The NFC application 111 may communicate data and commands with the NFCC 200 using the NFC middleware 113. When the NFC application 111 is executed, the NFC application 111 may control the NFCC 200 to communicate data and commands with an NFC terminal (e.g., an NFC reader, etc.) near the NFCC 200, for example by positioning the NFCC 200 within a desired distance of the NFC terminal that is within the NFC protocol's communication range. The NFC application 111 may include a payment function, an account management function, a financial transaction function, etc.

The NFCC 200 communicates data and/or commands with the SIM 300 and the eSE 400. The NFCC 200 also communicates data and/or commands with an NFC terminal (e.g., an NFC reader) through an antenna 250. The NFCC 200 may receive information, such as personal information, payment information, other NFC application related information, etc., stored in the SIM 300 or the eSE 400 and transmit the information (e.g., payment information) to the NFC reader through the antenna 250, so that operations related to the NFC application is performed (e.g., a payment operation is normally performed and/or is completed).

The SIM 300 is an IC chip or a card with various information, such as personal information, (i.e., subscriber information), and/or account information, etc. The SIM 300 may provide a subscriber with various services such as authentication, billing, and other secure functions using the subscriber information.

The SIM 300 may communicate with the modem 150. The modem 150 is an IC chip for mobile and/or wireless communication. The modem 150 may be in accordance with fourth generation mobile communications (i.e., 4G long term evolution) or fifth generation mobile communications, but the inventive concepts are not restricted to these examples and may be in accordance with other wireless communication standards.

The SIM 300 may also store payment and/or financial information (e.g., credit card information, bank account information, billing account information, stock trading account information, gift card information, virtual wallet information, digital currency information, etc.). The SIM 300 may transmit the payment information and/or financial information to the NFCC 200 at the request of the NFCC 200, so that NFC application operations related to payment functions, financial transaction functions, etc., are normally performed/completed.

The SIM 300 may be a universal SIM (USIM), or a single wire protocol (SWP) SIM, but is not restricted thereto. The USIM performs the function of a SIM authenticating a subscriber and the function of a universal integrated circuit card (UICC) with a function of a transportation card or a credit card. The SWP is a specification for connecting the NFCC 200 with the SIM 300 using a single wire.

The eSE 400 is an IC chip that stores and executes a security function and communicates with the NFCC 200. The eSE 400 may also store payment information and/or financial information and transmit the payment information and/or financial information to the NFCC 200 at the request of the NFCC 200, so that a payment operation and/or financial transaction operation is normally performed.

The mobile payment device 10 may include other elements in addition to the elements illustrated in FIG. 1 and/or may not include at least one of the elements illustrated in FIG. 1 according to other example embodiments of the inventive concepts. For instance, the mobile payment device 10 may not include the eSE 400 in at least one example embodiment.

Figure 2:
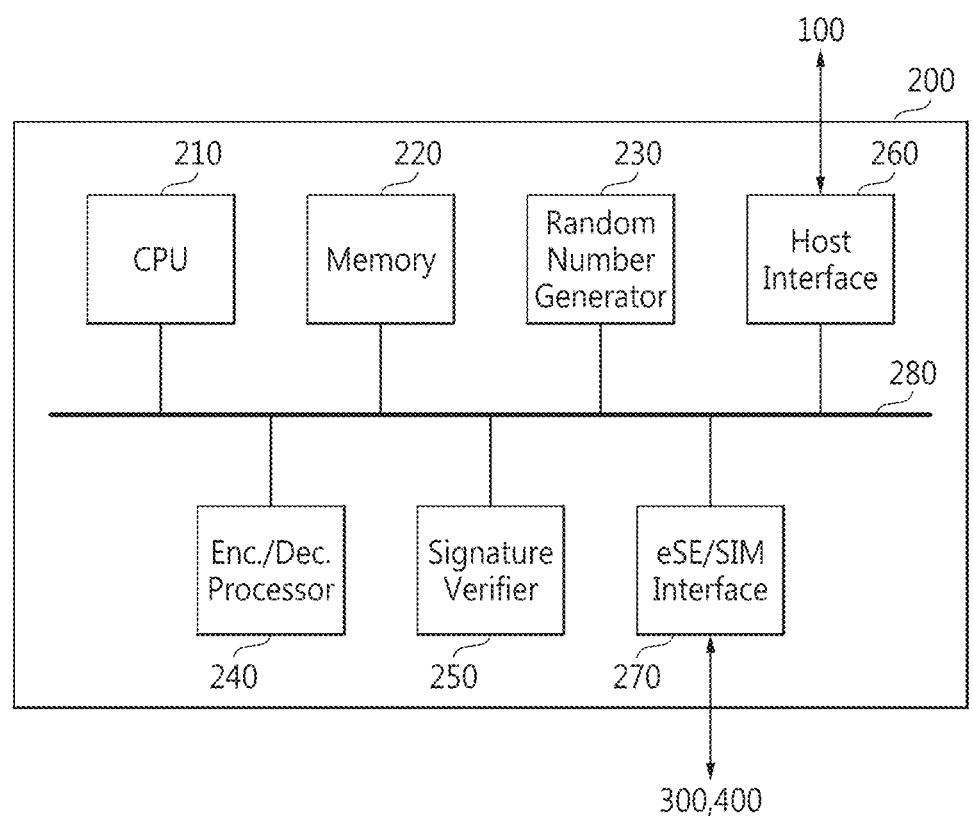
FIG. 2 is a block diagram of a near field communication controller (NFCC) illustrated in FIG. 1 according to some example embodiments of the inventive concepts.

FIG. 2 is a block diagram of the NFCC 200 illustrated in FIG. 1 according to at least one example embodiment of the inventive concepts. Referring to FIGS. 1 and 2, the NFCC 200 includes a central processing unit (CPU) 210, a memory 220, a random number generator 230, an encryption/decryption (Enc./Dec.) processor 240, a signature verifier 250, a host interface 260, and an eSE/SIM interface 270, but is not limited thereto.

The CPU 210 may be implemented as at least one microprocessor. The CPU 210 may also include one or more processing cores. The CPU 210 may execute NFCC firmware to control the overall operation of the NFCC 200. The NFCC firmware may be stored in the memory 220.

The memory 220 may be formed of non-volatile memory. The memory 220 may include read-only memory (ROM), flash memory, solid-state disk drive (SSD), hard disk drive, and/or other types of non-volatile memory. Payment information may be stored in the memory 220.

The random number generator 230 generates unique NFC data desired and/or necessary to selectively and/or automatically enable/disable a payment function. For instance, the random number generator 230 may generate a random number as the unique NFC data.

The Enc./Dec. processor 240 performs encryption and/or decryption of data requiring security. The Enc./Dec. processor 240 may encode information, such as payment information, etc., to be transmitted to an NFC reader/terminal through the antenna 250, or may decode information received from an NFC reader/terminal through the antenna 250. Accordingly, the NFCC 200 can protect data and/or programs requiring security from an attack like hacking.

The signature verifier 250 verifies signature data received from the host 100 in accordance with a cryptographic protocol, such as a Rivest-Shamir-Adleman (RSA) based protocol, Diffie-Hellman based protocol, Rabin based protocol, ElGamel based protocol, TRUEncrypt based protocol, DSA based protocol, PGP based protocol, etc. For example, the signature data may be digitally signed data using a Rivest-Shamir-Adleman (RSA) private key. The signature verifier 250 may verify the signature data using a public key, such as a Rivest-Shamir-Adleman (RSA) public key, but the inventive concepts are not restricted to this example and may use other encryption protocols.

The host interface 260 interfaces with the host 100. In detail, the host interface 260 may receive an NFC controller interface (NCI) command from the host 100 and transmit a response message responding to the command to the host 100. The host interface 260 may also communicate data with the host 100.

The eSE/SIM interface 270 interfaces with the eSE 400 and/or the SIM 300. For instance, the eSE/SIM interface 270 may transmit a request message to the eSE 400 and receive a response message from the eSE 400. Additionally, the eSE/SIM interface 270 may also communicate data with the eSE 400. The eSE/SIM interface 270 may transmit a request message to the SIM 300 and receive a response message from the SIM 300. The eSE/SIM interface 270 may also communicate data with the SIM 300.

The NFCC 200 may include other elements in addition to the elements illustrated in FIG. 2 and/or may not include one or more of the elements illustrated in FIG. 2 according to other example embodiments of the inventive concepts.

FIG. 3 is a flowchart of a method of operating a mobile payment device according to some example embodiments of the inventive concepts. The method illustrated in FIG. 3 may be performed using the mobile payment device 10 illustrated in FIGS. 1 and 2 according to at least one example embodiment.

Referring to FIGS. 1 through 3, the NFCC 200 sets default values when powered on in operation S110. At this time, a NFC function, such as a payment function, an account management function, etc., may be set to be disabled in operation S110. The NFCC 200 generates and sends unique data R_NFC to the normal host 110 in operation S120. The unique data cannot be manipulated and may be random data, i.e., a random number generated by the random number generator 230.

The normal host 110 receives the unique data R_NFC from the NFCC 200 and transmits it to the secure host 120 in operation S130. The secure host 120 verifies the normal host 110 and generates data V_SW (referred to as "verification data") indicating whether or not the normal host 110 is valid in operation S140. The secure host 120 also generates signature data based on the verification data V_SW and the unique data R_NFC generated by the NFCC 200 in operation S150. For instance, the secure host 120 may generate the signature data by signing the verification data V_SW and the unique data R_NFC using a first secure key (e.g., a first encryption key), a private key, etc., (e.g., a RSA private key) in operation S150. However, the inventive concepts are not restricted to the current example embodiments and may use other encryption protocols. The signature data generated by the secure host 120 may include the verification data V_SW and the unique data R_NFC signed using the first secure key, e.g., the RSA private key.

The secure host 120 sends the signature data to the normal host 110 in operation S160. The normal host 110 transmits the signature data to the NFCC 200 in operation S170.

The NFCC 200 verifies the signature data from the normal host 110 in operation S180 and selectively (or automatically) enables or disables the payment function, or other functions, according to the verification result in operation S190. For instance, the NFCC 200 may verify the signature data using a second secure key (e.g., a second encryption key), a public key (e.g., an RSA public key), etc., in operation S180. However, the inventive concepts are not restricted to the current example embodiments and may include the use of other cryptographic protocols. When the verification data V_SW indicating the validity of the normal host 110 indicates a "valid host" and the unique data R_NFC of the signature data is the same as unique data generated by the NFCC 200 according to the result of verifying the signature data, the NFCC 200 may enable the payment function, or other functions. As a result, the NFCC 200 receives payment information, or other information, stored in the eSE 400 or the SIM 300 and transmits it to an NFC reader, so that payment or other functions are normally performed.

When the verification data V_SW indicating the validity of the normal host 110 does not indicate a "valid host" and the unique data R_NFC of the signature data is not the same as the unique data generated by the NFCC 200 according to the result of verifying the signature data, the NFCC 200 may disable the payment function, or other function. As a result, the NFCC 200 does not transmit the payment information, or other information, stored in the eSE 400 or the SIM 300 to the NFC reader, so that the payment or other function is not performed. Accordingly, when the host 100 is not valid, the payment function or other function of the NFCC 200 is disabled, and therefore, illegal or unwanted payment is decreased and/or prevented, unauthorized access of the information stored on the eSE 400 or the SIM 300 is decreased and/or prevented, etc.

The order of operations S110 through S190 may be changed, or omitted, and at least two of the operations S110 through S190 may be performed in parallel in other example embodiments.

FIG. 4 is a flowchart of a method of operating a mobile payment device according to other example embodiments of the inventive concepts. The method illustrated in FIG. 4 may be performed by the mobile payment device 10 illustrated in FIGS. 1 and 2 according to at least one example embodiment.

Referring to FIGS. 1, 2, and 4, when the NFCC 200 is powered on, it sets default values in operation S210. At this time, a payment function or other function may be set to be disabled in operation S210. When the NFCC 200 is powered on, the normal host 110 issues a reset command CORE_RESET_CMD to the NFCC 200 in operation S215. The reset command CORE_RESET_CMD is issued to reset the NFCC 200. The NFCC 200 executes the reset command CORE_RESET_CMD and sends a reset response message CORE_RESET_RSP to the normal host 110 in operation S220.

For instance, the NFCC 200 may generate the unique data R_NFC in response to the reset command CORE_RESET_CMD and send the unique data R_NFC and the reset response message CORE_RESET_RSP together to the normal host 110 in operation S220. The reset command CORE_RESET_CMD may be an NCI command defined in the NCI technical specification of the NFC Forum™ in order to reset the NFCC 200 or a modified NCI command. The reset response message CORE_RESET_RSP may be an NCI message defined in the NCI technical specification of the NFC Forum™ in order to respond to the reset command CORE_RESET_CMD or a modified NCI message. The unique data R_NFC cannot be manipulated and may be random data, i.e., a random number generated by the random number generator 230.

The normal host 110 receives the unique data R_NFC generated by the NFCC 200 and transmits it to the secure host 120 in operation S230. The secure host 120 generates signature data based on the verification data V_SW indicating the validity of the normal host 110 and the unique data R_NFC generated by the NFCC 200 in operation S250. For instance, the secure host 120 may generate the signature data by signing the verification data V_SW and the unique data R_NFC using a first secure key (e.g., a first encryption key), a private key, etc., (e.g., a RSA private key) in operation S250. However, the inventive concepts are not restricted to the current example embodiments and may use other cryptographic protocols according to other example embodiments.

The secure host 120 sends the signature data to the normal host 110 in operation S260. The normal host 110 issues an initialization command CORE_INIT_CMD to initialize the NFCC 200 to the NFCC 200 in operation S270. At this time, the normal host 110 transmits the signature data to the NFCC 200 together with the initialization command CORE_INIT_CMD. For instance, the normal host 110 may insert the signature data into the initialization command CORE_INIT_CMD and transmit the initialization command CORE_INIT_CMD to the NFCC 200 in operation S270.

Figure 5A:
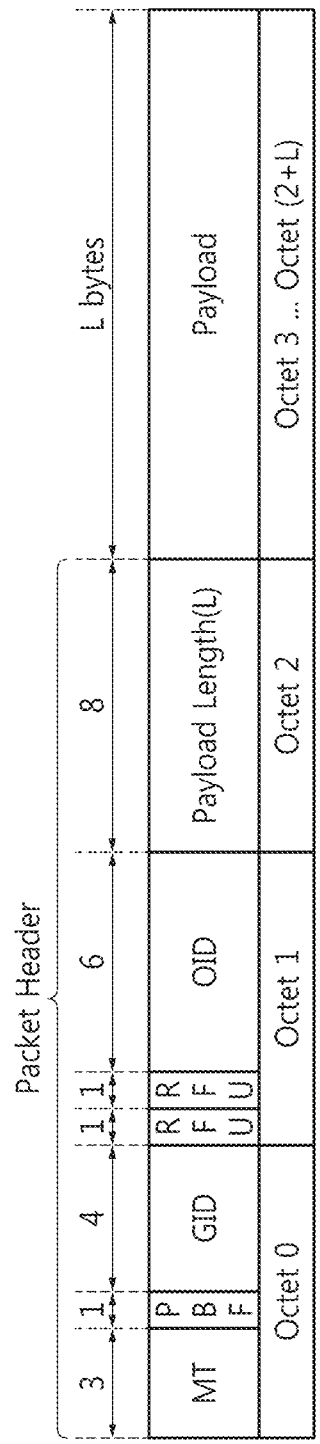
FIG. 5A is a diagram of the format of a control packet according to an NFC controller interface (NCI) technical specification.

FIG. 5A is a diagram of the format of a control packet according to the NCI technical specification. FIG. 5B is a diagram of the reset response message CORE_RESET_RSP illustrated in FIG. 4 according to some example embodiments of the inventive concepts. FIG. 5C is a diagram of the initialization command CORE_INIT_CMD illustrated in FIG. 4 according to some example embodiments of the inventive concepts.

Referring to FIG. 5A, commands and response messages exchanged between the normal host 110 and the NFCC 200 may have the control packet format illustrated in FIG. 5A. The reset command CORE_RESET_CMD and the reset response message CORE_RESET_RSP may also have the control packet format illustrated in FIG. 5A and may include a packet header and a payload.

The packet header may include a message type MT, a packet boundary flag PBF, a group identifier GID, an opcode identifier OID, and a payload length L. The payload may include the unique data R_NFC or the signature data.

The reset response message CORE_RESET_RSP may include payload fields illustrated in FIG. 5B. For instance, the reset response message CORE_RESET_RSP may include a status having a length of 1 octet, an NCI version having a length of 1 octet, a configuration status having a length of 1 octet, and a random number (i.e., R_NFC) having a length of "n" octets, where "n" is an integer of at least 1. The payload length L of the header in the control packet illustrated in FIG. 5A may be changed in order to allow an n-octet random number field to be embedded in the reset response message CORE_RESET_RSP as a payload field.

The initialization command CORE_INIT_CMD may include payload fields illustrated in FIG. 5C. The initialization command CORE_INIT_CMD may include feature enable information having a length of 0 or 2 octets and signature data having a length of "m" octets, where "m" is an integer of at least 1. The payload length L of the header in the control packet illustrated in FIG. 5A may be changed in order to allow the m-octet signature data to be embedded in the initialization command CORE_INIT_CMD as a payload field.

Referring back to FIG. 4, the NFCC 200 verifies the signature data received from the normal host 110 in operation S280 and selectively enables or disables the payment function, or other function, according to the verification result in operation S290. Operations S280 and S290 are similar to operations S180 and S190 illustrated in FIG. 3; thus detailed description thereof will be omitted in order to avoid redundancy.

Although the reset command CORE_RESET_CMD is used to transmit the unique data R_NFC and the reset response message CORE_RESET_RSP is used to transmit the signature data in the example embodiments illustrated in FIG. 4, the inventive concepts are not restricted to the current example embodiments. Different NCI commands or messages may be used to transmit the unique data R_NFC and the signature data in other example embodiments.

According to some example embodiments of the inventive concepts, the unique data R_NFC and the signature data are transmitted together with an existing NCI message or transmitted using a modification of the existing NCI message, so that performance degradation due to the separate transmission of the unique data R_NFC and the signature data may be reduced and/or prevented. In addition, a physical pin or pad does not need to be added to an NFCC, so that the increase of chip size is reduced and/or prevented. As a result, the NFCC packaging or process cost is not increased. Moreover, the example embodiments of the inventive concepts can be implemented by upgrading existing NFCC firmware.

Figure 6:
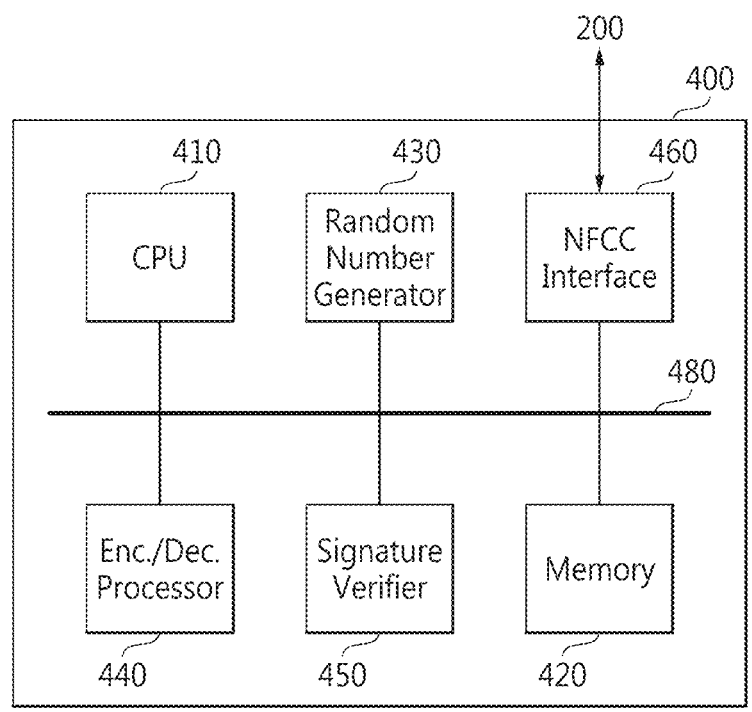
FIG. 6 is a block diagram of a secure module illustrated in FIG. 1 according to some example embodiments of the inventive concepts.

FIG. 6 is a block diagram of the eSE 400 illustrated in FIG. 1 according to some example embodiments of the inventive concepts. Referring to FIGS. 1 and 6, the eSE 400 includes a CPU 410, a memory 420, a random number generator 430, an Enc./Dec. processor 440, a signature verifier 450, and an NFCC interface 460.

The CPU 410 may be implemented as at least one microprocessor. The CPU 410 may also include one or more processing cores. The CPU 410 may execute secure module firmware to control the overall operation of the eSE 400. The secure module firmware may be stored in the memory 420.

The memory 420 may be formed of non-volatile memory, such as ROM, flash memory, SSD, hard disk drive, etc. Information, such as payment information, account information, financial information, user information, etc., may be stored in the memory 420.

The random number generator 430 generates unique eSE data R_SE desired and/or necessary to selectively (or automatically) enable or disable a NFC related function, such as a payment function. For instance, the random number generator 430 may generate a random number as the unique eSE data R_SE.

The Enc./Dec. processor 440 performs encryption and/or decryption of data requiring security. For example, the Enc./Dec. processor 440 may encode payment information to be transmitted to the NFCC 200. Accordingly, the eSE 400 can protect data and/or programs requiring security from an attack like hacking.

The signature verifier 450 verifies signature data received from the host 100. The signature verifier 450 may verify the signature data using a second secure key (e.g., a second encryption key), a public key (e.g., an RSA public key), etc., but the inventive concepts are not restricted to this example and may use other cryptographic protocols.

The NFCC interface 460 interfaces with the NFCC 200. In detail, the NFCC interface 460 may communicate control messages and data with the NFCC 200.

Figure 7:
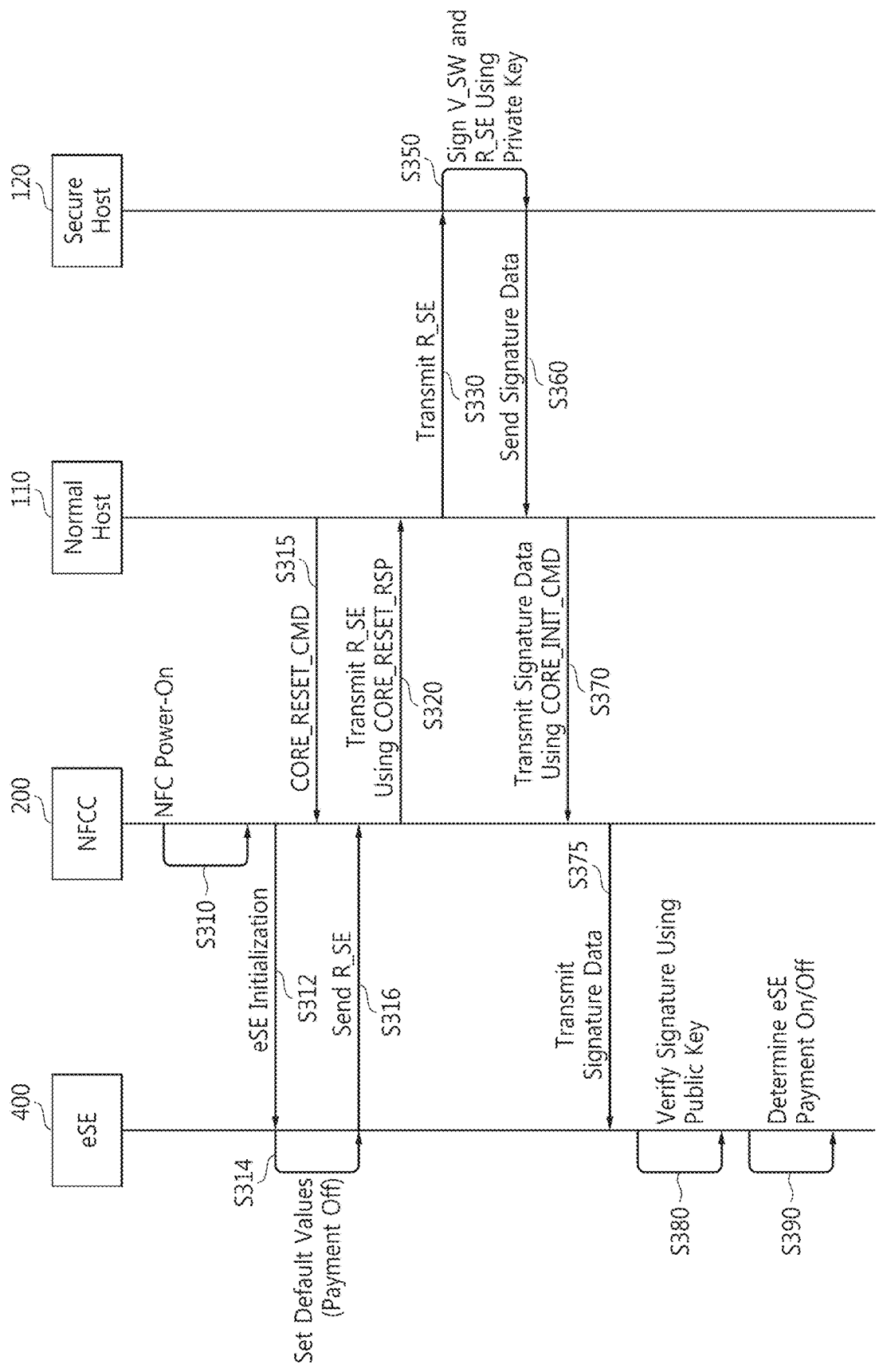
FIG. 7 is a flowchart of a method of operating a mobile payment device according to still other example embodiments of the inventive concepts.

FIG. 7 is a flowchart of a method of operating a mobile payment device according to still other example embodiments of the inventive concepts. The method illustrated in FIG. 7 may be performed by the mobile payment device 10 illustrated in FIGS. 1 and 6 according to at least one example embodiment.

Referring to FIGS. 1, 6, and 7, when the NFCC 200 is powered on in operation S310, the eSE 400 issues an initialization message, i.e., eSE initialization to initialize the eSE 400 in operation S312. The eSE 400 performs a desired (or alternatively, predetermined) initializing operation in response to the initialization message in operation S314. For instance, the desired or predetermined initializing operation may include setting default values of a register. At this time, a payment function may be set to be disabled in operation S314. In other words, the eSE 400 may set the payment function to "OFF" during the initialization. The eSE 400 also generates and sends the unique SE data R_SE to the NFCC 200 in response to the initialization message in operation S316.

The NFCC 200 transmits the unique SE data R_SE from the eSE 400 to the normal host 110 in operation S320. The unique SE data R_SE cannot be manipulated and may be random data, i.e., a random number generated by the random number generator 430. The reset command CORE_RESET_CMD and the reset response message CORE_RESET_RSP may be used to transmit the unique SE data R_SE to the normal host 110 as described above with reference to FIGS. 4 through 5C.

For instance, when the NFCC 200 is powered on, the normal host 110 issues the reset command CORE_RESET_CMD to the NFCC 200 in operation S315. The NFCC 200 executes the reset command CORE_RESET_CMD and transmits the unique SE data R_SE to the normal host 110 when sending the reset response message CORE_RESET_RSP to the normal host 110 in response to the reset command CORE_RESET_CMD in operation S320.

The normal host 110 transmits the unique SE data R_SE from the NFCC 200 to the secure host 120 in operation S330. Upon receiving the unique SE data R_SE from the normal host 110, the secure host 120 generates signature data based on the verification data V_SW indicating the validity of the normal host 110 and the unique data R_SE generated by the eSE 400 in operation S350. For instance, the secure host 120 may generate the signature data by signing the verification data V_SW and the unique data R_SE using a first secure key (e.g., a first encryption key), a private key, etc., (e.g., a RSA private key) in operation S350. However, the inventive concepts are not restricted to the current example embodiments and may include the use of other cryptographic protocols.

The secure host 120 sends the signature data to the normal host 110 in operation S360. The normal host 110 transmits the signature data from the secure host 120 to the NFCC 200 in operation S370. The initialization command CORE_INIT_CMD may be used to transmit the signature data to the NFCC 200 as described above with reference to FIGS. 4 through 5C. For instance, the normal host 110 issues the initialization command CORE_INIT_CMD to initialize the NFCC 200 to the NFCC 200 in operation S370. At this time, the normal host 110 transmits the signature data to the NFCC 200 together with the initialization command CORE_INIT_CMD. For instance, the normal host 110 may insert the signature data into the initialization command CORE_INIT_CMD and send the initialization command CORE_INIT_CMD to the NFCC 200 in operation S370.

The NFCC 200 transmits the signature data from the normal host 110 to the eSE 400 in operation S375. The eSE 400 verifies the signature data from the NFCC 200 in operation S380 and selectively (or automatically) enables or disables a NFC function, such as the payment function, according to the verification result in operation S390. For instance, the eSE 400 may verify the signature data using a second secure key (e.g., a second encryption key), a public key (e.g., an RSA public key), etc., in operation S380. However, the inventive concepts are not restricted to the current example embodiments and may include the use of other cryptographic protocols.

When the verification data V_SW indicating the validity of the normal host 110 indicates a "valid host" and the unique data R_SE of the signature data is the same as unique data generated by the eSE 400 according to the result of verifying the signature data, the eSE 400 may enable the desired function, such as the payment function. For example, when the payment function is enabled, the eSE 400 may send the payment information stored therein to the NFCC 200. As a result, the NFCC 200 receives the payment information stored in the eSE 400 and transmits it to an NFC reader, so that payment (or other function) is normally performed.

When the verification data V_SW indicating the validity of the normal host 110 does not indicate a "valid host" and the unique data R_SE of the signature data is not the same as the unique data generated by the eSE 400 according to the result of verifying the signature data, the eSE 400 may disable the desired function, e.g., payment function. For example, when the payment function is disabled, the eSE 400 does not send the payment information stored therein to the NFCC 200. As a result, the NFCC 200 cannot transmit the payment information (or other information) stored in the eSE 400 to the NFC reader, so that the payment or other function is not performed. Accordingly, when the host 100 is not valid, the function of the eSE 400 is disabled, such as the payment function, and therefore, illegal or unwanted payment is decreased and/or prevented, unauthorized access of the information stored on the eSE 400 is decreased and/or prevented, etc.

According to example embodiments of the inventive concepts, the unique data R_SE and the signature data are transmitted together with an existing NCI message or transmitted using a modification of the existing NCI message, so that performance degradation due to the separate transmission of the unique data R_SE and the signature data may be decreased and/or prevented. In addition, a physical pin or pad does not need to be added to an NFCC to prevent payment from being performed by an invalid host, so that the increase of chip size is decreased and/or prevented. Moreover, the example embodiments of the inventive concepts can be implemented by upgrading existing NFCC firmware.

Figure 8:
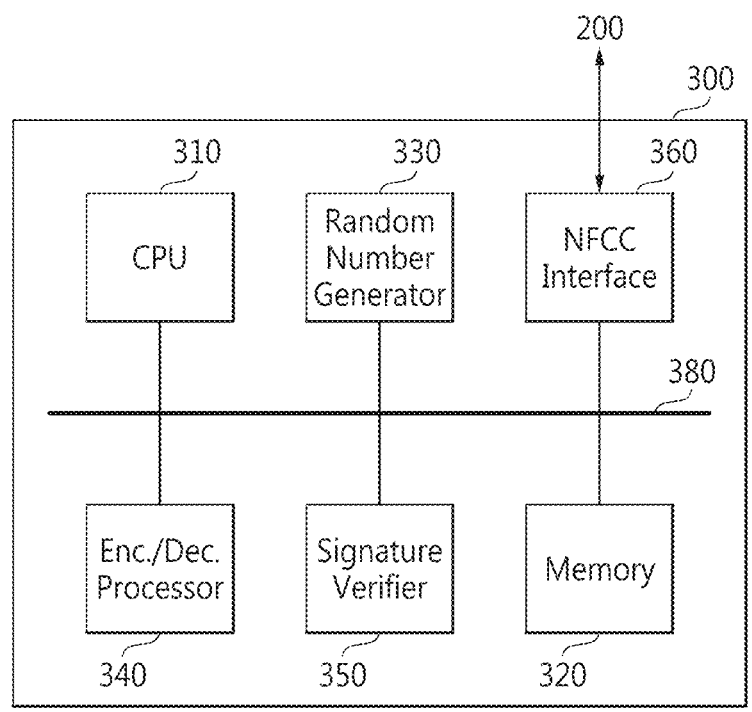
FIG. 8 is a block diagram of a subscriber identity module (SIM) illustrated in FIG. 1 according to some example embodiments of the inventive concepts.

FIG. 8 is a block diagram of the SIM 300 illustrated in FIG. 1 according to some example embodiments of the inventive concepts. Referring to FIGS. 1 and 8, the SIM 300 includes a CPU 310, a memory 320, a random number generator 330, an Enc./Dec. processor 340, a signature verifier 350, and an NFCC interface 360.

The CPU 310 may be implemented as at least one microprocessor. The CPU 310 may include one or more processing cores. The CPU 310 may execute SIM firmware to control the overall operation of the SIM 300. The SIM firmware may be stored in the memory 320.

The memory 320 may be formed of non-volatile memory, such as ROM, flash memory, SSD, hard disk drive, etc. Information, such as subscriber information, payment information, etc., may be stored in the memory 320.

The random number generator 330 generates unique SIM data R_SIM necessary to selectively (or automatically) enable or disable a payment function or other desired function. For instance, the random number generator 330 may generate a random number as the unique SIM data R_SIM.

The Enc./Dec. processor 340 performs encryption and/or decryption of data requiring security. The Enc./Dec. processor 340 may encode payment information, or other information, to be transmitted to the NFCC 200. Accordingly, the SIM 300 can protect data and/or programs requiring security from an attack like hacking.

The signature verifier 350 verifies signature data received from the host 100. The signature verifier 350 may verify the signature data using a second secure key (e.g., a second encryption key), a public key (e.g., an RSA public key), etc., but the inventive concepts are not restricted to this example and may include other cryptographic protocols.

The NFCC interface 360 interfaces with the NFCC 200. In detail, the NFCC interface 360 may communicate control messages and data with the NFCC 200.

Figure 9:
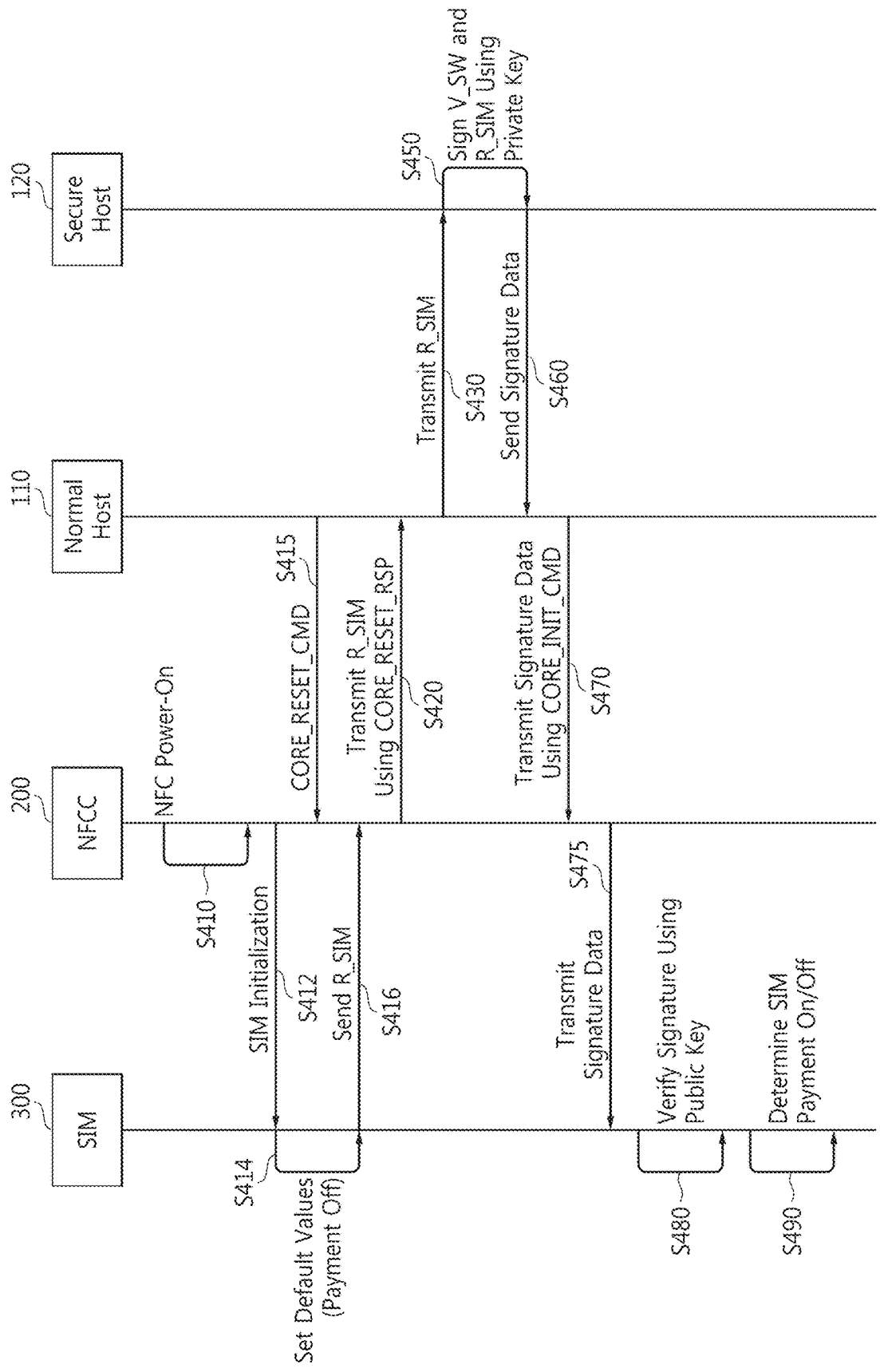
FIG. 9 is a flowchart of a method of operating a mobile payment device according to further example embodiments of the inventive concepts.

FIG. 9 is a flowchart of a method of operating a mobile payment device according to further example embodiments of the inventive concepts. The method illustrated in FIG. 9 may be performed by the mobile payment device 10 illustrated in FIGS. 1 and 8 according to at least one example embodiment.

Referring to FIGS. 1, 8, and 9, when the NFCC 200 is powered on in operation S410, the SIM 300 issues an initialization message, i.e., SIM initialization to initialize the SIM 300 in operation S412. The SIM 300 performs a desired (or alternatively, predetermined) initializing operation in response to the initialization message in operation S414. For instance, the desired or predetermined initializing operation may include setting default values of a register. Additionally, a desired function, such as a payment function, may be set to be disabled in operation S414. In other words, the SIM 300 may set the payment function to "OFF" during the initialization. The SIM 300 also generates and sends the unique SIM data R_SIM to the NFCC 200 in response to the initialization message in operation S416.

The NFCC 200 transmits the unique SIM data R_SIM from the SIM 300 to the normal host 110 in operation S420. The unique SIM data R_SIM cannot be manipulated and may be random data, i.e., a random number generated by the random number generator 330. The reset command CORE_RESET_CMD and the reset response message CORE_RESET_RSP may be used to transmit the unique SIM data R_SIM to the normal host 110 as described above with reference to FIGS. 4 through 5C.

For instance, when the NFCC 200 is powered on, the normal host 110 issues the reset command CORE_RESET_CMD to the NFCC 200 in operation S415. The NFCC 200 executes the reset command CORE_RESET_CMD and transmits the unique SIM data R_SIM to the normal host 110 when sending the reset response message CORE_RESET_RSP to the normal host 110 in response to the reset command CORE_RESET_CMD in operation S420.

The normal host 110 transmits the unique SIM data R_SIM from the NFCC 200 to the secure host 120 in operation S430. Upon receiving the unique SIM data R_SIM from the normal host 110, the secure host 120 generates signature data based on the verification data V_SW indicating the validity of the normal host 110 and the unique data R_SIM generated by the SIM 300 in operation S450. For instance, the secure host 120 may generate the signature data by signing the verification data V_SW and the unique data R_SIM using a first secure key (e.g., a first encryption key), a private key, etc., (e.g., a RSA private key) in operation S450. However, the inventive concepts are not restricted to the current example embodiments and may include other cryptographic protocols.

The secure host 120 sends the signature data to the normal host 110 in operation S460. The normal host 110 transmits the signature data from the secure host 120 to the NFCC 200 in operation S470. The initialization command CORE_INIT_CMD may be used to transmit the signature data to the NFCC 200 as described above with reference to FIGS. 4 through 5C. For instance, the normal host 110 issues the initialization command CORE_INIT_CMD to initialize the NFCC 200 to the NFCC 200 in operation S470. At this time, the normal host 110 transmits the signature data to the NFCC 200 together with the initialization command CORE_INIT_CMD. For instance, the normal host 110 may insert the signature data into the initialization command CORE_INIT_CMD and send the initialization command CORE_INIT_CMD to the NFCC 200 in operation S470.

The NFCC 200 transmits the signature data from the normal host 110 to the SIM 300 in operation S475. The SIM 300 verifies the signature data from the NFCC 200 in operation S480 and selectively (or automatically) enables or disables the desired function, such as the payment function, according to the verification result in operation S490. For instance, the SIM 300 may verify the signature data using a second secure key (e.g., a second encryption key), a public key (e.g., an RSA public key), etc., in operation S480. However, the inventive concepts are not restricted to the current example embodiments and may include other cryptographic protocols.

When the verification data V_SW indicating the validity of the normal host 110 indicates a "valid host" and the unique data R_SIM of the signature data is the same as unique data generated by the SIM 300 according to the result of verifying the signature data, the SIM 300 may enable the desired function, such as the payment function. For example, when the payment function is enabled, the SIM 300 may send the payment information or other information stored therein to the NFCC 200. As a result, the NFCC 200 receives the payment information stored in the SIM 300 and transmits it to an NFC reader, so that payment or other function is normally performed.

When the verification data V_SW indicating the validity of the normal host 110 does not indicate a "valid host" and the unique data R_SIM of the signature data is not the same as the unique data generated by the SIM 300 according to the result of verifying the signature data, the SIM 300 may disable the desired function, such as the payment function. For example, when the payment function is disabled, the SIM 300 does not send the payment information stored therein to the NFCC 200. As a result, the NFCC 200 cannot transmit the payment information or other information stored in the SIM 300 to the NFC reader, so that the payment or other function is not performed. Accordingly, when the host 100 is not valid, the payment function or other function of the eSE 400 is disabled, and therefore, illegal or unwanted payment is decreased and/or prevented, unauthorized access of the information stored on the SIM 300 is decreased and/or prevented, etc.

According to example embodiments of the inventive concepts, the unique data R_SIM and the signature data are transmitted together with an existing NCI message or are transmitted using a modification of the existing NCI message, so that performance degradation due to the separate transmission of the unique data R_SIM and the signature data may be reduced and/or prevented. In addition, a physical pin or pad does not need to be added to the SIM 300 to reduce and/or prevent payment from being performed by an invalid host, so that the increase of chip size is prevented. Moreover, the example embodiments of the inventive concepts can be implemented by upgrading existing SIM firmware.

Figure 10:
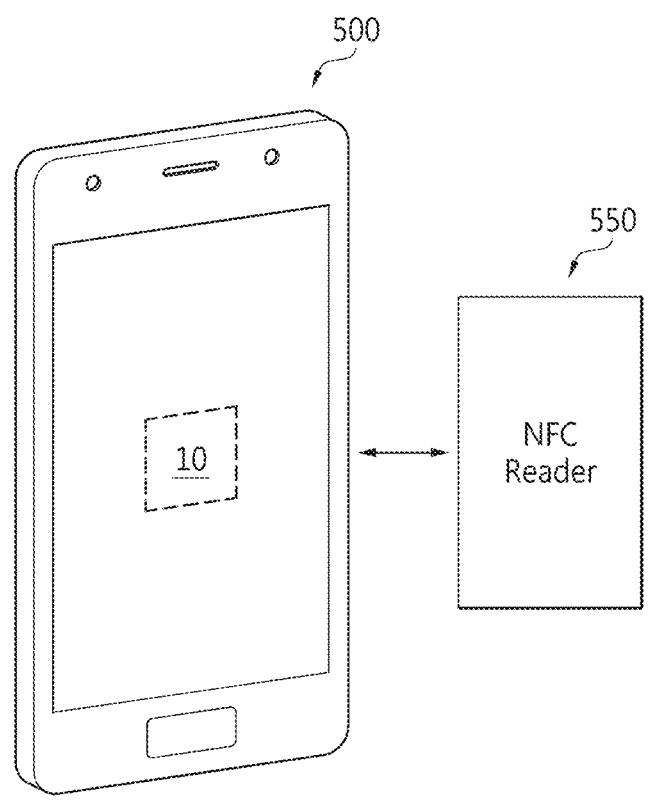
FIG. 10 is a schematic diagram of a mobile terminal according to some example embodiments of the inventive concepts.

FIG. 10 is a schematic diagram of a mobile terminal 500 according to some example embodiments of the inventive concepts. Referring to FIG. 10, the mobile terminal 500 may include the payment device 10 illustrated in FIG. 1. The mobile terminal 500 may be implemented as a smart phone, a tablet PC, a PDA, an EDA, a MID, a wearable device, a laptop, an Internet of Things (IoT) device, a portable gaming console, etc., but the inventive concepts are not restricted to these examples.

As described above, the payment device 10 of the mobile terminal 500 may selectively (or automatically) enable or disable a payment function or other desired function based on data used to verify the validity of a host. For example, when the payment function is enabled, the payment device 10 of the mobile terminal 500 sends payment information to an NFC reader 550, so that payment is normally performed. When the payment function is disabled, the payment device 10 of the mobile terminal 500 does not send the payment information to the NFC reader 550, so that payment is not performed.

As described above, according to some example embodiments of the inventive concepts, a payment function or other function is disabled when a host is not valid, so that illegal or unwanted payment can be reduced and/or prevented, unauthorized access of the information stored on the SIM 300 is decreased and/or prevented, etc. In addition, data exchanged to verify the validity of the host is transmitted together with an existing NCI message or transmitted using a modification of the existing NCI message, so that performance degradation is reduced and/or prevented. Moreover, since it is not necessary to add a physical pin or pad to an NFCC or a payment module such as an eSE or a SIM, the increase of chip size is prevented. As a result, packaging or process cost for the NFCC or the payment module is not increased. Furthermore, the example embodiments of the inventive concepts can be implemented by upgrading existing NFCC or payment module firmware.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of operating a payment device, the payment device including a near field communication controller (NFCC) and a host, the host configured to communicate with the NFCC and including a normal host and a secure host, the method comprising:
   generating, using the NFCC, unique data;
   sending, using the NFCC, the unique data to a normal host;
   transmitting, using the normal host, the unique data to a secure host;
   generating, using the secure host, signature data based on verification data and the unique data, the verification data obtained by verifying validity of the normal host;
   sending, using the secure host, the signature data to the normal host;
   transmitting, using the normal host, the signature data to the NFCC;
   verifying, using the NFCC, the signature data; and
   selectively enabling, using the NFCC, a payment function according to a result of the verifying, and
      the host including the secure host operating based on a secure operating system and the normal host operating based on a normal operating system.

2. The method of claim 1, further comprising:
   disabling, using the NFCC, the payment function before the generating the unique data.

3. The method of claim 2, wherein the disabling the payment function is performed when the NFCC is powered on.

4. The method of claim 3, further comprising:
   issuing, using the normal host, a reset command to the NFCC to reset the NFCC; and
   sending, using the NFCC, a reset response message to the normal host in response to the reset command,
   wherein the unique data is transmitted together with the reset response message from the NFCC to the normal host.

5. The method of claim 4, wherein the unique data is included in a payload field of the reset response message.

6. The method of claim 3, further comprising:
   issuing, using the normal host, an initialization command to the NFCC, the initialization command initializing the NFCC,
   wherein the signature data is transmitted together with the initialization command from the normal host to the NFCC.

7. The method of claim 6, wherein the signature data is included in a payload field of the initialization command.

8. The method of claim 1, wherein the generating the signature data includes
   signing the verification data and the unique data using a first secure key, and the first secure key is a Rivest-Shamir-Adleman (RSA) private key.

9. The method of claim 8, wherein the verifying the signature data includes verifying, using the NFCC, the signature data using a second secure key, and the second secure key is an RSA public key.

10. The method of claim 1, wherein the unique data is a randomly generated number.

11. A payment device comprising:
    a near field communication controller (NFCC);
    a host including a normal host and a secure host, the host configured to communicate with the NFCC, the normal host configured to operate based on a normal operating system, and the secure host configured to operate based on a secure operating system;
    the NFCC is further configured to,
       generate unique data, and
       send the unique data to the normal host;
    the normal host is further configured to,
       transmit the unique data to the secure host;
    the secure host is further configured to,
       generate signature data based on verification data and the unique data,
    the verification data obtained by verifying validity of the normal host,
       send the signature data to the normal host;
    the normal host is further configured to,
       transmit the signature data to the NFCC; and
    the NFCC is further configured to,
       verify the signature data, and
       selectively enable a payment function according to a result of the verifying.

12. The payment device of claim 11, wherein the NFCC is further configured to:
    disable the payment function before the generation of the unique data.

13. The payment device of claim 12, wherein the NFCC is further configured to disable the payment function in response to the NFCC being powered on.

14. The payment device of claim 13, wherein
    the normal host is further configured to,
       issue a reset command to the NFCC to reset the NFCC;
    the NFCC is further configured to,
       send a reset response message to the normal host in response to the reset command; and
    the unique data is transmitted together with the reset response message from the NFCC to the normal host.

15. The payment device of claim 14, wherein the unique data is included in a payload field of the reset response message.

16. The payment device of claim 13, wherein the normal host is further configured to:
    issue an initialization command to the NFCC, the initialization command initializing the NFCC,
    wherein the signature data is transmitted together with the initialization command from the normal host to the NFCC.

17. The payment device of claim 16, wherein the signature data is included in a payload field of the initialization command.

18. The payment device of claim 11, wherein the secure host is further configured to generate the signature data by:

signing the verification data and the unique data using a first secure key, the first secure key being a Rivest-Shamir-Adleman (RSA) private key.

19. The payment device of claim 18, wherein the NFCC is further configured to verify the signature data by:
verifying the signature data using a second secure key, the second secure key being an RSA public key.

20. The payment device of claim 11, wherein the unique data is a randomly generated number.

* * * * *

UNITED STATES PATENT AND TRADEMARK OFFICE
CERTIFICATE OF CORRECTION

| | | |
|---|---|---|
| PATENT NO. | : 11,763,289 B2 | Page 1 of 1 |
| APPLICATION NO. | : 17/078600 | |
| DATED | : September 19, 2023 | |
| INVENTOR(S) | : Joong Chul Yoon | |

It is certified that error appears in the above-identified patent and that said Letters Patent is hereby corrected as shown below:

On the Title Page

Correct Item (72) to read:
-- (72) Inventor: Joong Chul YOON --

Signed and Sealed this
Ninth Day of April, 2024

Katherine Kelly Vidal
*Director of the United States Patent and Trademark Office*